United States Patent [19]

Flynn

[11] Patent Number: 5,273,339
[45] Date of Patent: Dec. 28, 1993

[54] TAILGATE ENCLOSURE DEVICE HAVING REDUCED DRAG

[76] Inventor: Donald E. Flynn, 11340 Arcola, Livonia, Mich. 48150

[21] Appl. No.: 940,014

[22] Filed: Sep. 3, 1992

[51] Int. Cl.⁵ .............................................. B62D 25/00
[52] U.S. Cl. .................................. 296/180.1; 296/50; 296/57.1
[58] Field of Search ...................... 296/50, 57.1, 180.1

[56] References Cited

U.S. PATENT DOCUMENTS

| | | | |
|---|---|---|---|
| 4,136,905 | 1/1979 | Morgan | 296/50 |
| 4,353,589 | 10/1982 | Hartberg | 296/50 |
| 4,743,058 | 5/1988 | Fedrigo | 296/180.1 |
| 4,861,088 | 8/1989 | Fedrigo | 296/57.1 |
| 4,861,093 | 8/1989 | Chapman | 296/180.1 |
| 4,902,066 | 2/1990 | Norman | 296/180.1 |

Primary Examiner—Robert R. Song
Attorney, Agent, or Firm—Brooks & Kushman

[57] ABSTRACT

A tailgate enclosure device (10) for retaining a load carried in a cargo hold (12) of a pickup truck. The cargo hold (12) has a loading bed (14) and a pair of lateral walls (16, 18). The device (10) is swingable between a vertical closed and a horizontal open position about a pair of pivots (58, 60). The device (10) comprises a generally rectangular, tubular frame (20) having a pair of opposing long horizontal members (22, 24), one of which being disposed adjacent the loading bed (14). The device (10) also comprises a pair of opposing short members (26, 28) extending between the long members (22, 24), the short members (26, 28) being positionable adjacent the lateral walls (16, 18) when the device (10) is oriented in the closed position. Also, the device (10) has a generally elliptically shaped tubular frame (30) disposed within the rectangular frame (20) to impart rigidity to the device (10) without any significant increase in drag. The elliptically shaped frame (30) surrounds a central circular, tubular member (44) having a radius (48) such that the central member (44) lies in contact with the elliptically shaped frame (30). The elliptically shaped frame (30) also surrounds a pair of smaller circular, tubular members (50, 52), each being disposed on either side of the central member (44), whereby the device (10) offers a reduced drag profile as the pickup truck travels through and displaces ambient air.

17 Claims, 1 Drawing Sheet

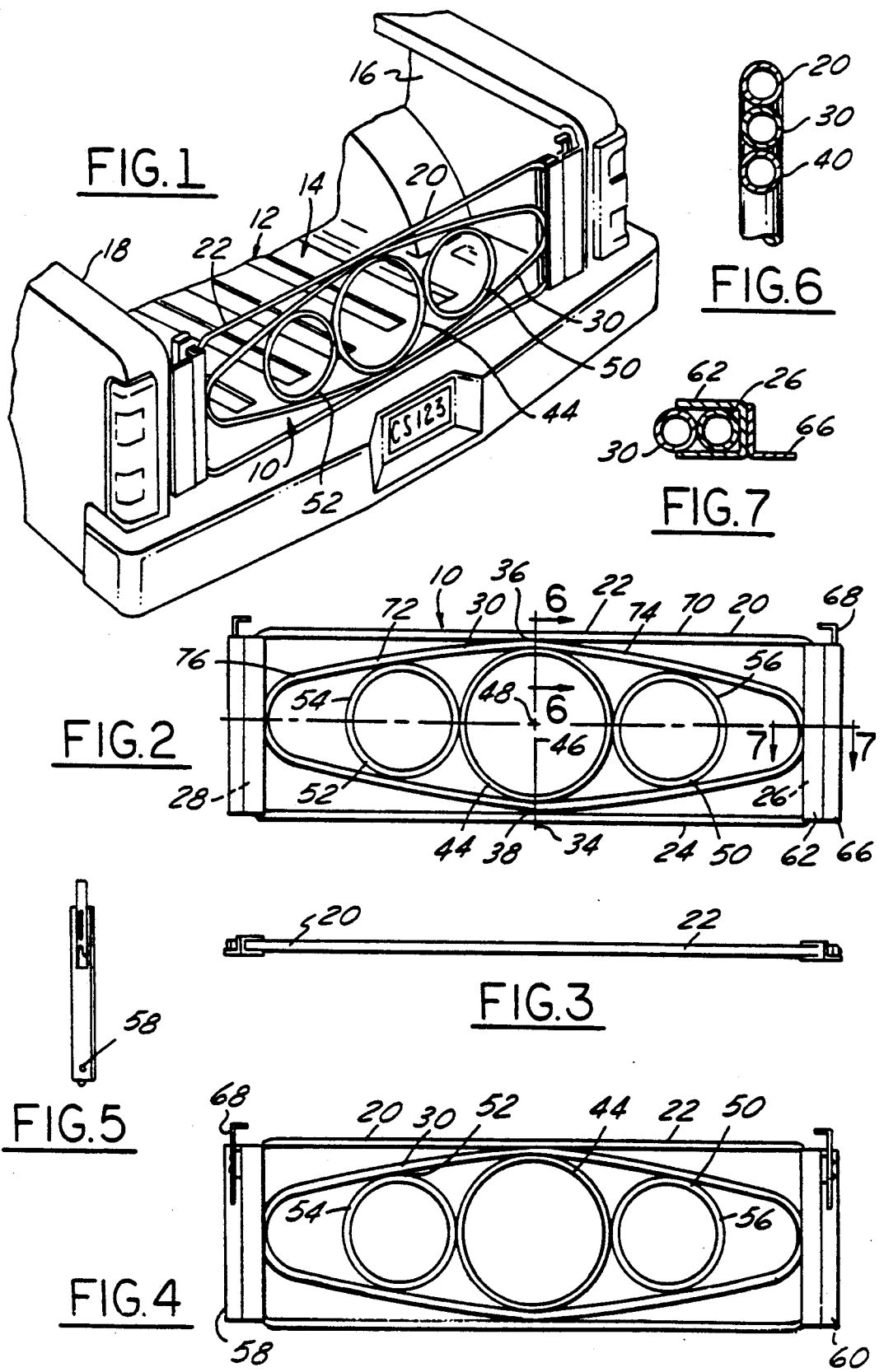

TAILGATE ENCLOSURE DEVICE HAVING REDUCED DRAG

TECHNICAL FIELD

This invention relates to a tailgate enclosure device for use on a pickup truck. More particularly, the present invention is concerned with a tailgate enclosure device which offers a reduced drag profile as the pickup truck travels through and displaces ambient air.

BACKGROUND ART

Pickup trucks generally include a loading bed and a pair of lateral walls. A tailgate is pivotally mounted between the lateral walls and has an edge which lies adjacent to the loading bed. Conventional tailgates are swingable between a vertical closed and a horizontal opened position about the pivots.

When the tailgate is secured in the vertical closed position, articles are generally confined on the loading bed between the lateral walls, the cabin of the pickup truck, and the tailgate. In that position, the pickup truck as a whole presents more drag when travelling through and displacing ambient air at a given vehicle speed than if the tailgate is positioned in the horizontal opened position. This is because, as the pickup truck travels through ambient air, displaced air may flow downwardly and inwardly from the lateral walls of the cargo hold with significant impedance by the closed tailgate.

In general, the need has arisen for an air-permeable tailgate which would serve to constrain loads mounted in the cargo hold, while offering a reduced, aerodynamically efficient drag profile. Such approaches are exemplified by U.S. Pat. No. 4,353,589 which issued on Oct. 12, 1982. That reference discloses an air permeable closure assembly wherein the tailgate takes the form of an opened grid which permits the free flow of air through the tailgate and decreases the wind resistance of the vehicle, reduces drag, increases mileage, and allows rearward freedom of vision. Another approach is exemplified by U.S. Pat. No. 4,861,093 which issued on Aug. 29, 1989. That reference discloses a vented tailgate for use on a pickup truck. The tailgate is provided with transversely extending louver members which define downwardly and rearwardly inclined air passageways which permit the passage of air through the tailgate.

DISCLOSURE OF THE INVENTION

The present invention provides a tailgate enclosure device for retaining a load carried in a cargo hold of a pickup truck. The cargo hold has a loading bed and a pair of lateral walls. The device is swingable between a vertical closed and a horizontal opened position about a pair of pivots.

The device includes a generally rectangular tubular frame with a pair of opposing long members, one of which being disposed adjacent the loading bed. Extending between the long members is a pair of opposing short members, the short members being disposable adjacent the lateral walls when the device is oriented in the closed position.

A generally elliptically shaped tubular frame is disposed within the rectangular frame to impart rigidity to the device without a significant increase in drag. The elliptically shaped frame defines a major axis intersecting the short members and a minor axis intersecting the long members at points of intersection. The elliptically shaped frames are connected to the rectangular frame at the points of intersection.

Located on the major and minor axes is the center of a circular tubular member which has a radius such that the central member lies in contact with the elliptically shaped frame. A pair of smaller circular tubular members is included in the device. Each of the smaller circular tubular members is disposed on either side of the central member and defines a periphery which runs arcuately between the central member and the elliptically shaped frame.

Because of its tubular construction and absence of sharp contour, the device offers a reduced drag profile while retaining the strength needed to contain loads as the pickup truck travels through and displaces ambient air.

It is an object of the present invention to provide a tailgate enclosure device which reduces the overall wind resistance of a pickup truck.

Another object of the present invention is to provide a tailgate enclosure device which afford substantially unrestricted rearward vision, especially when operating the pickup truck in reverse gear.

Yet another object of the present invention is to provide a tailgate enclosure device which permits a substantially unimpeded path through which air may pass through the rear of the pickup truck.

Other objects and advantages of the present invention will become apparent from consideration of the following description in connection with the drawings.

BRIEF DESCRIPTION OF THE DRAWINGS

FIG. 1 is a perspective view of a pickup truck which depicts the present invention in a vertical closed position at the rear of the pickup truck;

FIG. 2 is an elevational view of the tailgate enclosure of the present invention when viewed from behind the pickup truck looking forwardly;

FIG. 3 is a bottom view of the tailgate enclosure device depicted in FIG. 2;

FIG. 4 is an elevational view of the tailgate enclosure device of the present invention when viewed from the front of the pickup truck looking rearwardly;

FIG. 5 is a left side elevational view of the tailgate enclosure device depicted in FIG. 2;

FIG. 6 is a partial sectional view of the tailgate enclosure device taken along the line 6—6 of FIG. 2; and FIG. 7 is a partial sectional view of the tailgate enclosure device taken along the line 7—7 of FIG. 2.

BEST MODE(S) FOR CARRYING OUT THE INVENTION

Referring now to the drawings, and more particularly to FIG. 1, there is schematically shown a tailgate enclosure device 10 for retaining a load carried in a cargo hold 12 of a pickup truck. The cargo hold 12 has a loading bed 14 and a pair of lateral walls 16, 18. The tailgate enclosure device 10 is swingable between a vertical closed position (as shown) and a horizontal opened position about a pair of pivots 58 (one of which is depicted in FIG. 5). The device 10 is designed to be retro-fitted to the existing latch and hinge mechanism of the conventional pickup truck.

Preferably, the device 10 comprises a generally rectangular, tubular frame 20 having four rounded corners. The rectangular, tubular frame 20 has a pair of opposing long members 22, one of which being disposed adjacent the loading bed 14, regardless of whether the device is in its closed or opened position.

Extending between the long members 22, 24 is a pair of opposing short members 26, 28. The short members 26, 28 are positionable adjacent the lateral wall 16 when the device 10 is oriented in the closed position. Disposed within the rectangular frame 20 is a generally elliptically shaped tubular frame 30 which imparts rigidity to the device 10 without significant increase in drag. Geometrically, and for positional orientation, the elliptically shaped frame 30 defines a major axis 32 intersecting the short members 26, 28 and a minor axis 34 which intersects the long horizontal members 22, 24 at four points of intersection, two of which being shown by the reference numerals 36, 38 in FIG. 2. The elliptically shaped frame 30 is connected to the rectangular frame 20 at those four points of intersection.

A central circular tubular member 44 has a center 46 disposed upon the major 32 and minor 34 axes. It has a radius 48 such that the central member 44 lies in contact with the elliptically shaped frame 30.

Disposed on either side of the central member 44 is one of a pair of small tubular members 50, 52. Each member 50, 52 defines a periphery 54, 56 which runs arcuately between the central member 44 and the elliptically shaped frame 30.

Because of its tubular structure, the device 10 is light in weight and is strong. Where bulky loads are housed in the cargo hold 12, the tailgate enclosure device 10 serves to arrest rearward movement of the load when the pickup truck accelerates in a forward direction.

As noted above, the tailgate enclosure device 10 of the present invention is designed to be fully compatible with existing latch and hinge mechanisms available on conventional pickup trucks. Accordingly, it should be realized that the pivot 58 (FIG. 5) which cooperates with the lateral wall 18 has a similar pivot (not shown) which cooperates with the lateral wall 16.

Turning now to FIGS. 2 and 7, there is depicted one channel member 62 which supports a portion 26 of the rectangular tubular frame 20 and the elliptical tubular frame 30. A similar channel member is disposed on the opposing side of the tailgate enclosure device 10. Each channel member 62 cooperates with a latch plate 66 (FIGS. 2 and 7).

In operation, the tailgate enclosure device 10 may be securely positionable in the vertical closed position by operation of the latching mechanism 68. When the latching mechanism 68 is disengaged, the tailgate enclosure device 10 may be swung about the pivots, such as that designated by the reference numeral 58, toward an opened, horizontal position. In that position, the effective length of the cargo hold 12 becomes extended.

In a preferred embodiment, the rectangular tubular frame 20 is assembled from a pair of U-shaped members 70, 72. The members 70, 72 have ends which are disposed parallel in relationship with the minor axis 34 of the elliptical tubular frame 30. In practice, the mating ends engage in a telescoping relationship. Also, the elliptical tubular frame 30 includes a pair of U-shaped segments 74, 76. Again, the mating ends receive each other in a telescoping relationship.

To facilitate shipment and assembly, the U-shaped members 70, 72 and segments 74, 76 are packaged together in a unit, the outside dimensions of which do not exceed one-half of the width of the loading bed 14 of the pickup truck.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A tailgate enclosure device for retaining a load carried in a cargo hold of a pickup truck, the cargo hold having a loading bed and a pair of lateral walls, the device being swingable between a vertical closed and a horizontal open position, the device comprising:
   a rectangular frame having
      a pair of opposing long horizontal members, one of which members being disposed adjacent the loading bed, and
      a pair of opposing short members extending between the long members, the short members being positionable adjacent the lateral walls when the device is oriented in the closed position;
   a curvilinear frame rigidly connected to the rectangular frame to impart stability to the device without significant increase in drag;
   a central curvilinear member rigidly connected to the curvilinear frame; and
   a pair of smaller curvilinear members rigidly connected to the curvilinear frame and the central curvilinear member, each being disposed on one side of the central member,
   whereby the device offers a reduced drag profile as the pickup truck travels through and displaces ambient air.

2. The tailgate enclosure device of claim 1, wherein the rectangular frame includes a plurality of rounded corners.

3. The tailgate enclosure device of claim 1, further comprising:
   a channel member extending between the long members and enclosing within a hollow portion thereof a section of the curvilinear frame.

4. The tailgate enclosure device of claim 3, wherein the curvilinear frame is secured within the channel member at a point of intersection with the major axis of the curvilinear frame.

5. The tailgate enclosure device of claim 3, further comprising:
   a latching mechanism for selective engagement of the device with the lateral walls of the cargo hold, the latching mechanism being secured to each channel member.

6. The tailgate enclosure device of claim 1, wherein the frames and the members are tubular in cross section.

7. A tailgate enclosure device for retaining a load carried in a cargo hold of a pickup truck, the cargo hold having a loading bed and a pair of lateral walls, the device being swingable between a vertical closed and a horizontal open position about a pair of pivots, the device comprising:
   a rectangular, tubular frame having a pair of opposing long horizontal members, one of which members being disposed adjacent the loading bed, and
   a pair of opposing short members extending between the long members, the short members being positionable adjacent the lateral walls when the device is oriented in the closed position;

an elliptically shaped tubular frame disposed within the rectangular frame to impart rigidity to the device without any significant increase in drag, the elliptically shaped frame defining a major axis intersecting the short members and a minor axis intersecting the long members at points of intersection, the elliptically shaped frame being connected to the rectangular frame at the points of intersection;

a central circular, tubular member having a center disposed upon the major and minor axes and a radius such that the central member lies in contact with the elliptically shaped frame; and a pair of smaller circular, tubular members, each being disposed on either side of the central member and defining a periphery which runs arcuately between the central member and the elliptically shaped frame, whereby the device offers a reduced drag profile as the pickup truck travels through and displaces ambient air.

8. The tailgate enclosure device of claim 7, wherein the generally rectangular frame comprises:

a pair of opposing U-shaped members having ends which are disposed parallel to the minor axis of the generally elliptically shaped tubular frame.

9. The tailgate enclosure device of claim 7, wherein the generally elliptically shaped tubular frame includes a pair of U-shaped segments having ends which are disposed in parallel relationship with the minor axis of the elliptically shaped frame.

10. The tailgate enclosure device of claim 7, wherein:

the generally rectangular frame includes a pair of opposing U-shaped members having ends which are disposed parallel to the minor axis of the generally elliptically shaped tubular frame; and the generally elliptically shaped tubular frame includes a pair of U-shaped segments having ends which are disposed in parallel relationship with the minor axis of the elliptically shaped frame.

11. The tailgate enclosure device of claim 10, wherein the U-shaped members of the rectangular frame receive each other in a telescoping relationship.

12. The tailgate enclosure device of claim 10, wherein the U-shaped segments of the elliptical frame receive each other in a telescoping relationship.

13. An assembly for a tailgate enclosure device of a pickup truck, the assembly comprising:

a pair of U-shaped members for forming a rectangular frame;

pair of U-shaped segments for forming an elliptically shaped frame, each U-shaped segment being rigidly connected to a respective one of the pair of U-shaped members, each member having a pair of interconnecting semi-circular elements rigidly connected to a respective one of the U-shaped segments and semi-circular elements;

a central circular member having a pair of interconnecting semi-circular elements rigidly connected to a respective one of the U-shaped segments; and a pair of smaller circular members, the assembly being packaged in a unit having dimensions not exceeding one-half of the width of loading bed of the pickup truck.

14. The ornamental design for the tailgate enclosure device as shown.

15. The tailgate enclosure device of claim 1, wherein each of the rectangular frame, the curvilinear frame, and at least one of the curvilinear members includes a pair of interlocking U-shaped segments for forming the associated frame or member.

16. The tailgate enclosure device for retaining a load carried in a cargo hold of a pickup truck, the cargo hold having a loading bed and a pair of lateral walls, the device being swingable between a vertical closed and a horizontal open position, the device comprising:

a rectangular frame having a pair of opposing long horizontal members, one of which member is being disposed adjacent the loading bed, and a pair of opposing short members extending between the long members, the short members being positionable adjacent the lateral walls when the device is oriented in the closed position;

a frame disposed within the rectangular frame to impart rigidity to the device without significant increase in drag, the frame being connected to the rectangular frame; and a central member sized such that the central member lies in contact with the frame, whereby the device offers a reduced drag profile as the pickup truck travels through and displaces ambient air.

17. A tailgate enclosure device for retaining a load carried in a cargo hold of a pickup truck, the cargo hold having a loading bed and a pair of lateral walls, the device being swingable between a vertical closed and a horizontal open position, the device comprising:

a rectangular frame having a pair of opposing long horizontal members, one of which members being disposed adjacent the loading bed, and a pair of opposing short members extending between the long members, the short members being positionable adjacent the lateral walls when the device is oriented in the closed position;

a curvilinear frame rigidly connected to the rectangular frame to impart rigidity to the device without significant increase in drag; and a central curvilinear member rigidly connected to the curvilinear frame;

whereby the device offers a reduced drag profile as the pickup truck travels through and displaces ambient air.

* * * * *